(12) United States Patent
Zhao et al.

(10) Patent No.: US 10,795,199 B2
(45) Date of Patent: Oct. 6, 2020

(54) LIQUID-CRYSTAL DISPLAY PANEL AND DISPLAY DEVICE THEREOF

(71) Applicants: Shanghai Tianma Micro-Electronics Co., Ltd., Shanghai (CN); CHENGDU TIANMA MICRO-ELECTRONICS CO. LTD., Chengdu (CN)

(72) Inventors: Jian Zhao, Shanghai (CN); Ling Shen, Shanghai (CN); Feng Qin, Shanghai (CN); Zhidan Su, Shanghai (CN)

(73) Assignees: SHANGHAI TIANMA MICRO-ELECTRONICS CO., LTD., Shanghai (CN); CHENGDU TIANMA MICRO-ELECTRONICS CO., LTD., Chengdu (CN)

( * ) Notice: Subject to any disclaimer, the term of this patent is extended or adjusted under 35 U.S.C. 154(b) by 0 days.

(21) Appl. No.: 16/208,835

(22) Filed: Dec. 4, 2018

(65) Prior Publication Data
US 2020/0073168 A1   Mar. 5, 2020

(30) Foreign Application Priority Data
Aug. 31, 2018   (CN) .......................... 2018 1 1014592

(51) Int. Cl.
*G02F 1/1333* (2006.01)
*G02F 1/133* (2006.01)
(Continued)

(52) U.S. Cl.
CPC .... *G02F 1/133382* (2013.01); *G02F 1/13306* (2013.01); *G02F 1/13439* (2013.01);
(Continued)

(58) Field of Classification Search
CPC ......... G02F 1/134309; G02F 2201/122; G02F 1/133382
See application file for complete search history.

(56) References Cited

U.S. PATENT DOCUMENTS

2008/0316416 A1* 12/2008 Chang ............... G02F 1/133382
                                                349/150
2014/0063429 A1*  3/2014 Huh .................. G02F 1/133707
                                                349/139
(Continued)

FOREIGN PATENT DOCUMENTS

CN      105182585 A      12/2015
CN      205594258 U       9/2016
(Continued)

OTHER PUBLICATIONS

The European Patent Office (EPO) The Extended European Search Report for 19174288.1 dated Jul. 22, 2019 8 Pages.

*Primary Examiner* — Michael H Caley
*Assistant Examiner* — Mariam Qureshi
(74) *Attorney, Agent, or Firm* — Anova Law Group PLLC

(57) ABSTRACT

A liquid-crystal display panel and a liquid-crystal display device are provided. The display panel includes a display region and a non-display region surrounding the display region. The display panel also includes a first base including a first substrate, and a plurality of gate lines, a plurality of data lines, and a plurality of sub-pixels disposed in the display region. Moreover, the display panel includes a second base including a second substrate, and a liquid-crystal layer disposed between the first base and the second base. In addition, the display panel includes a heating power terminal disposed in the non-display region and including a first heating power terminal for outputting a high voltage and a second heating power terminal for outputting a low voltage. Further, the display panel includes at least one heating electrode disposed between the first substrate and the second substrate and used to heat the liquid-crystal layer.

19 Claims, 11 Drawing Sheets

(51) Int. Cl.
*G02F 1/1343* (2006.01)
*G02F 1/1362* (2006.01)

(52) U.S. Cl.
CPC .. *G02F 1/134309* (2013.01); *G02F 1/136286* (2013.01); *G02F 2201/122* (2013.01)

(56) References Cited

U.S. PATENT DOCUMENTS

| | | | |
|---|---|---|---|
| 2014/0211134 A1* | 7/2014 | Yang | G02F 1/133382 |
| | | | 349/106 |
| 2015/0370119 A1 | 12/2015 | Liu et al. | |
| 2016/0103358 A1* | 4/2016 | Tanaka | G06F 3/0412 |
| | | | 349/12 |
| 2016/0246132 A1* | 8/2016 | Cho | G02F 1/134309 |
| 2017/0090240 A1* | 3/2017 | Liu | G02F 1/13338 |
| 2018/0203279 A1* | 7/2018 | Zhou | G02F 1/13338 |
| 2019/0121191 A1* | 4/2019 | Hegyi | G01J 3/2823 |
| 2019/0203279 A1* | 7/2019 | Landegren | C12Q 2531/125 |

FOREIGN PATENT DOCUMENTS

| | | |
|---|---|---|
| CN | 108761930 A | 11/2018 |
| KR | 20060087951 A | 8/2006 |

\* cited by examiner

LIQUID-CRYSTAL DISPLAY PANEL AND DISPLAY DEVICE THEREOF

CROSS-REFERENCES TO RELATED APPLICATIONS

This application claims the priority of Chinese patent application No. 201811014592.7, filed on Aug. 31, 2018, the entirety of which is incorporated herein by reference.

FIELD OF THE DISCLOSURE

The present disclosure generally relates to the field of display technology and, more particularly, relates to a liquid-crystal display panel and a liquid-crystal display device.

BACKGROUND

Because a liquid-crystal display device for military purpose or in-vehicle display purpose is often required to be operated in a special operation environment, the liquid-crystal display device has to adapt a substantially wide environmental temperature range. Sometimes the liquid-crystal display device must operate normally in a temperature range of approximately −20° C.-55° C. However, because a viscosity coefficient of the liquid-crystal material increases as the temperature decreases, a threshold voltage rises, a response speed becomes slow, and a liquid-crystal crystallization phenomenon even occurs, which causes the liquid-crystal display device nonoperational.

For example, for a Sharp's wide-temperature-type liquid-crystal display device, a normal-temperature-type device has a normal operation point at a low temperature of approximately −5° C., and the wide-temperature-type device has a normal operation point at a low temperature of approximately −10° C. When being lower than such temperature, the response speed of the liquid-crystal display device will slow down. Therefore, in the development of the liquid-crystal display device for military purpose or in-vehicle display purpose, the low temperature operation range of the liquid-crystal display device needs to be broadened to ensure the normal operation of the liquid-crystal display device in the low-temperature environment. The disclosed liquid-crystal display panel and liquid-crystal display device are directed to solve one or more problems set forth above and other problems.

BRIEF SUMMARY OF THE DISCLOSURE

One aspect of the present disclosure provides a liquid-crystal display panel. The display panel includes a display region and a non-display region surrounding the display region. The display panel also includes a first base including a first substrate, and a plurality of gate lines, a plurality of data lines, and a plurality of sub-pixels, disposed on the first substrate. The plurality of sub-pixels are disposed in the display region. Moreover, the display panel includes a second base including a second substrate, and a liquid-crystal layer disposed between the first base and the second base. In addition, the display panel includes a heating power terminal disposed in the non-display region. The heating power terminal includes a first heating power terminal for outputting a high voltage and a second heating power terminal for outputting a low voltage. Further, the display panel includes at least one heating electrode disposed between the first substrate and the second substrate and used to heat the liquid-crystal layer. Each heating electrode includes at least one sub-electrode, and two ends of the each heating electrode are connected to the first heating power terminal and the second heating power terminal, respectively.

Another aspect of the present disclosure provides a liquid-crystal display device. The display device includes a liquid-crystal display panel. The display panel includes a display region and a non-display region surrounding the display region. The display panel also includes a first base including a first substrate, and a plurality of gate lines, a plurality of data lines, and a plurality of sub-pixels, disposed on the first substrate. The plurality of sub-pixels are disposed in the display region. Moreover, the display panel includes a second base including a second substrate, and a liquid-crystal layer disposed between the first base and the second base. In addition, the display panel includes a heating power terminal disposed in the non-display region. The heating power terminal includes a first heating power terminal for outputting a high voltage and a second heating power terminal for outputting a low voltage. Further, the display panel includes at least one heating electrode disposed between the first substrate and the second substrate and used to heat the liquid-crystal layer. Each heating electrode includes at least one sub-electrode, and two ends of the each heating electrode are connected to the first heating power terminal and the second heating power terminal, respectively.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
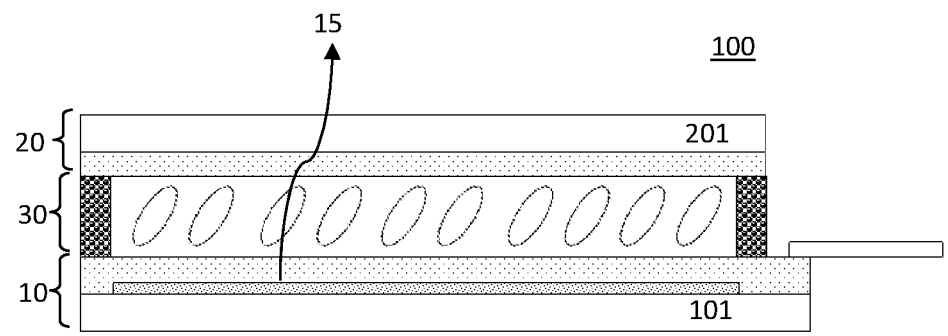
FIG. 1 illustrates a schematic diagram of an exemplary liquid-crystal display panel consistent with disclosed embodiments of the present disclosure.

FIG. 1 illustrates a schematic diagram of an exemplary liquid-crystal display panel consistent with disclosed embodiments of the present disclosure. Referring to FIG. 1, the liquid-crystal display panel 100 may include oppositely disposed first base 10 and second base 20, and a liquid-crystal layer 30 disposed in a boxed space formed by sealing the first base 10 and the second base 20 using a peripheral sealant. An image may be displayed by applying an external electric field.

In one embodiment, the first base 10 may be, e.g., an array substrate, which may include a first substrate 101 and a pixel array formed on the first substrate 101. The first base 10 may be disposed in a display region, and under the action of a driving signal, may generate a driving electric field to act on the liquid-crystal layer 30. The second base 20 may be, e.g., a color film substrate, which may include a second substrate 201 and a color filter layer formed on the second substrate 201. In another embodiment, the color filter layer may be disposed on the first base. In certain embodiments, the color filter layer may not be disposed in the liquid-crystal display panel (merely displaying black and white image), which is not limited by the present disclosure.

The liquid-crystal display panel 100 may further include at least one heating electrode 15 disposed inside the liquid-crystal display panel 100. In one embodiment, the heating electrode 15 may be disposed on a side of the first substrate 101 of the first base 10 facing toward the liquid-crystal layer 30. In another embodiment, the heating electrode 15 may be disposed on a side of the second substrate 201 of the second base 20 facing toward the liquid-crystal layer 30. Therefore, the heat generated by the heating electrode 15 may directly act on the liquid-crystal molecules in the liquid-crystal layer 30 without being spaced apart by the base of the substrate, thereby improving the heating performance. In one embodiment, referring to FIG. 1, the heating electrode 15 may be disposed over the first base 10 and may be disposed on the side of the first substrate 101 facing toward the liquid-crystal layer 30.

Figure 2:
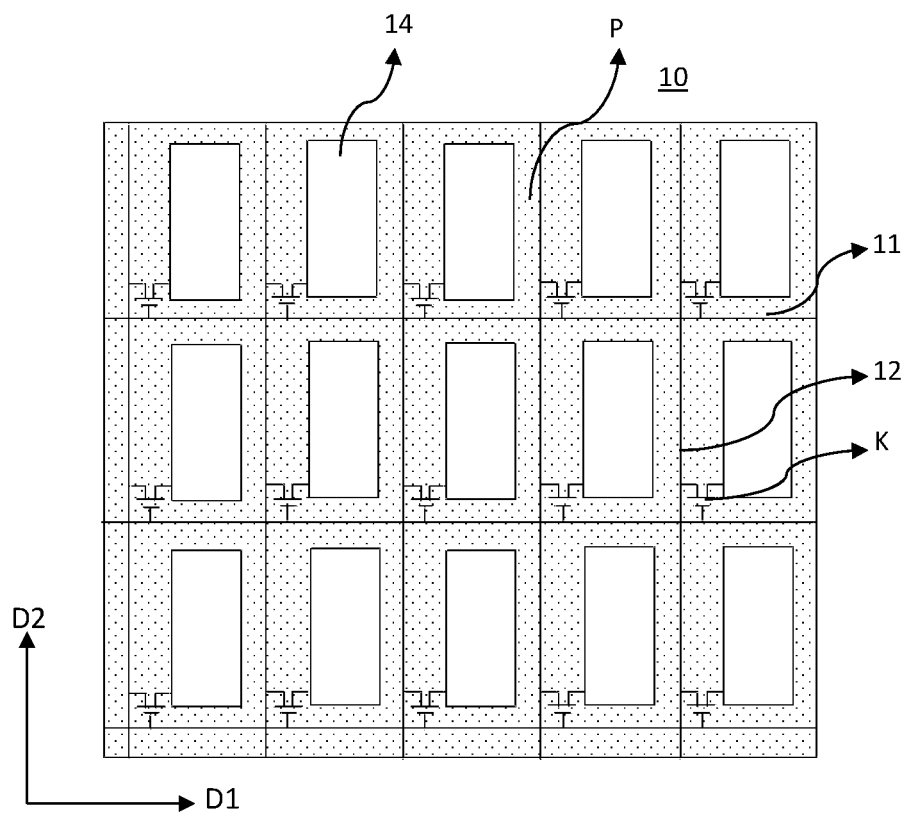
FIG. 2 illustrates a schematic diagram of a first base of an exemplary liquid-crystal display panel consistent with disclosed embodiments of the present disclosure.

The first base 10 as an array substrate is used as an example for detailed description. FIG. 2 illustrates a schematic diagram of the first base of the liquid-crystal display panel in FIG. 1. Referring to FIG. 2, the first base 10 may include the first substrate 101 and the pixel array formed on the first substrate 101. The pixel array may include a plurality of gate lines 11 and a plurality of data lines 12, which may be sequentially disposed on the first substrate 101. The gate lines 11 may be extended in a row direction (a direction indicated by D1 in FIG. 2) and arranged in a column direction (a direction indicated by D2 in FIG. 2). The data lines 12 may be extended in the column direction and arranged in the row direction. The gate lines 11 and the data lines 12 may be insulated from each other and cross each other to define a plurality of sub-pixels P. The pixel array may include a plurality of rows of sub-pixels and a plurality of columns of sub-pixels. A same one data line 12 may be connected to the sub-pixels P disposed in a same one column, and a same one gate line 11 may be connected to the sub-pixels P disposed in a same one row.

A pixel electrode 14 and at least one switching element K for display purpose may be disposed in each sub-pixel P. The switching element K for display purpose may be, e.g., a thin film transistor. A gate of the thin film transistor may be connected to a corresponding gate line 11, a source of the thin film transistor may be connected to a corresponding data line 12, and a drain of the thin film transistor may be connected to a corresponding pixel electrode 14.

The first base 10 may further include a plurality of opening regions and a light-shielding region disposed around the opening regions. Each opening region may be disposed in each sub-pixel P, and may allow light to pass through to display an image. The gate lines 11 and the data lines 12 may be disposed in the light-shielding region.

Figure 3:
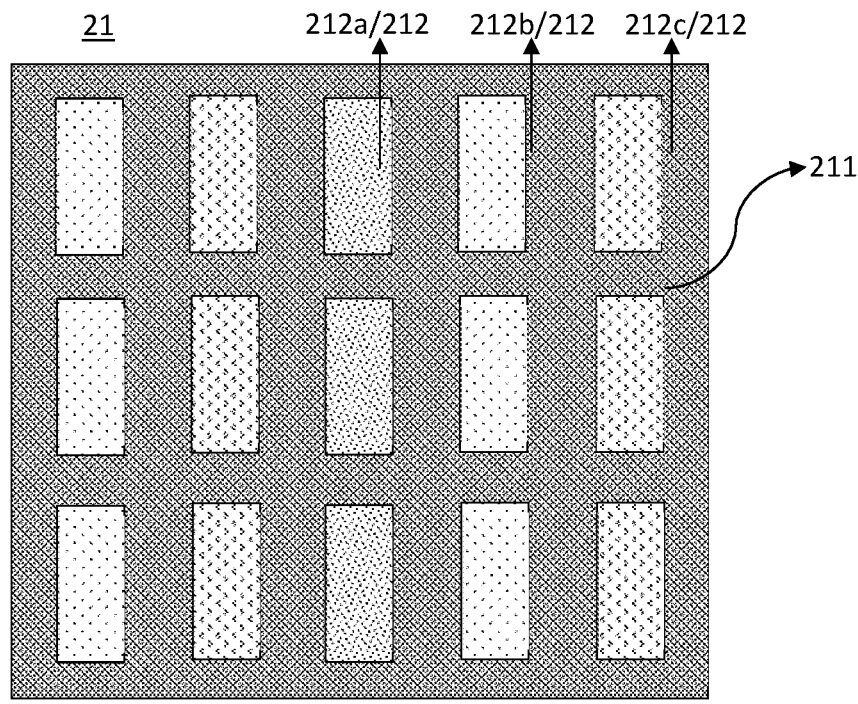
FIG. 3 illustrates a schematic diagram of an exemplary color filter layer consistent with disclosed embodiments of the present disclosure.

FIG. 3 illustrates a schematic diagram of a color filter layer consistent with disclosed embodiments of the present disclosure. Referring to FIG. 3, the liquid-crystal display panel 100 may further include a color filter layer 21. The color filter layer 21 may include a plurality of color resistors 212 and a black matrix 211 disposed around the color resistors 212. The color resistor 212 may include, e.g., a first color resistor 212a, a second color resistor 212b, and a third color resistor 212c having different colors, which may be disposed corresponding to the opening region of each sub-pixel P, respectively. The first color resistor 212a, the second color resistor 212b, and the third color resistor 212c may be, e.g., a red color resistor, a green color resistor, and a blue color resistor, respectively, which may be disposed corresponding to adjacent three sub-pixels P, respectively, to form one pixel unit. The black matrix 211 may be disposed between adjacent color resistors 212 to space apart the adjacent color resistors 212 and to prevent color mixture. At the same time, the black matrix 211 may be disposed corresponding to the light-shielding region of the first base 10. The gate lines 11 and the data lines 12 may be disposed in a region covered by the black matrix 211, which may prevent light leakage due to metal reflection. In another embodiment, the color filter layer 21 may be disposed on the first base 10, and the region covered by the black matrix 211 may form the light-shielding region, which is not limited by the present disclosure.

Figure 4:
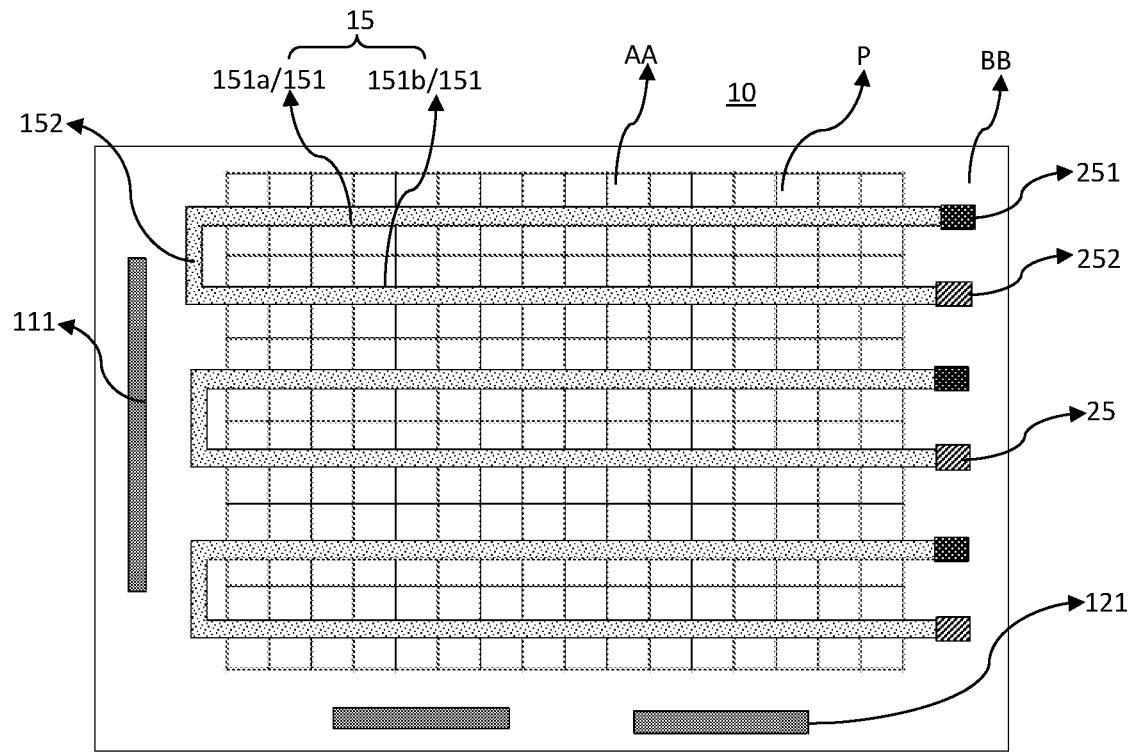
FIG. 4 illustrates a schematic diagram of a heating electrode of an exemplary liquid-crystal display panel consistent with disclosed embodiments of the present disclosure.

FIG. 4 illustrates a schematic diagram of a heating electrode of a liquid-crystal display panel consistent with disclosed embodiments of the present disclosure. Referring to FIG. 4, the first base 10 may further include a display driving circuit. The display driving circuit may include a gate driving circuit 111 and a data driving circuit 121 disposed in a non-display region. The plurality of gate lines 11 may be connected to the gate driving circuit 111, and the plurality of data lines 12 may be connected to the data driving circuit 121. The gate driving circuit 111 may transmit a scanning signal for each sub-pixel P through a corresponding gate line 11, and the data driving circuit 121 may transmit a data signal for each sub-pixel P through a corresponding data line 12.

In one embodiment, referring to FIG. 4, the first base 10 may further include a plurality of heating electrodes 15 disposed on the side of the first substrate 101 facing toward the liquid-crystal layer 30. Each heating electrode 15 may include one or more interconnected sub-electrodes 151. In one embodiment, the liquid-crystal display panel in the disclosed embodiments may include a display region AA and a non-display region BB disposed around the display region AA.

Each heating electrode 15 may include electrically-connected first sub-electrode 151a and second sub-electrode 151b. The first sub-electrode 151a and the second sub-electrode 151b may be extended in the row direction and span a row of sub-pixels P, respectively. A first end of the first sub-electrode 151a may be a head of each heating electrode 15, and a first end of the second sub-electrode 151b may be an end of each heating electrode 15. A second terminal of the first sub-electrode 151a and a second terminal of the second sub-electrode 151b may be disposed in the non-display region on a same side of the first base 10, and the second terminal of the first sub-electrode 151a may be connected to the second terminal of the second sub-electrode 151b by a connection electrode 152 extended in the column direction. In one embodiment, the first sub-electrode 151a, the second sub-electrode 151b and the connection electrode 152 may be made of a same material and may be formed in a same film forming process. In one embodiment, the first sub-electrode 151a may span the $x^{th}$ row of sub-pixels P, the second sub-electrode 151b may span the $x+1^{th}$ row of sub-pixels P, and the second terminal of the first sub-electrode 151a may be in direct contact with the second terminal of the second sub-electrode 151b, where x is an integer greater than or equal to 1.

The heating electrode 15 may further include a heating power terminal 25 disposed in the non-display region BB of the first base 10. In one embodiment, the gate driving circuit 111 may be disposed on a side of the first base 10 in the row direction, and the heating power terminal 25 and the gate driving circuit 111 may be disposed in the non-display region BB on the left and right sides of the display region AA, respectively. Each heating power terminal 25 may include at least one first heating power terminal 251 for outputting a high voltage and at least one second heating power terminal 252 for outputting a low voltage. The head of each heating electrode 15 may be connected to a corresponding first heating power terminal 251, and the end of each heating electrode 15 may be connected to a corresponding second heating power terminal 252. The first heating power terminal 251 and the second heating power terminal 252 may be simultaneously disposed in the non-display region BB on a same side of the first base 10. The heating electrode may be heated by a DC voltage provided by the heating power terminal to preheat the liquid-crystal molecules in the liquid-crystal display panel or to keep the liquid-crystal molecules continuously operating at a certain temperature.

When the entire heating electrode layer is connected to one power bus and the heating power is supplied through the one power bus, the current on the power bus may be too large, which may cause a risk of burning out the power bus. In the disclosed embodiments, a plurality of heating electrodes may be disposed in the liquid-crystal display panel, and different heating electrode may be connected to a different heating power terminal, and, thus, each heating electrode may be separately controlled. Therefore, the stability of the heating electrode and the reliability of the liquid-crystal display panel may be improved.

Further, according to different temperature of the region where each heating electrode is disposed, different heating power source may be supplied to each heating electrode. The closer to the peripheral region of the liquid-crystal display panel, the faster the heat is lost. In one embodiment, through a voltage control, a heat generation rate of the heating electrode in a region closer to the peripheral region of the liquid-crystal display panel may be faster, thereby improving the temperature uniformity of the liquid-crystal display panel.

In one embodiment, the liquid-crystal display panel may further include a heating control module. In one embodiment, the heating control module may be disposed in the non-display region of the first base. In another embodiment, the heating control module may be disposed on a driving circuit board for the liquid-crystal display panel. In certain embodiments, the heating control module may be disposed on a driving circuit board for an individual heating structure. The heating control module may be disposed on any other suitable location, which is not limited by the present disclosure. The heating control module may be connected to the heating power terminal 25 and may be further connected to the heating electrode. The heating electrode may be heated by the DC voltage provided by the heating control module to preheat the liquid-crystal molecules in the liquid-crystal display panel or to keep the liquid-crystal molecules continuously operating at a certain temperature.

In one embodiment, the liquid-crystal display panel may include a standby stage, a pre-operation stage (also referred to as a preheat stage), and an operation stage. In the standby stage, the liquid-crystal display device where the liquid-crystal display panel is located may be in a shutdown state, i.e., a state in which the liquid-crystal display device is not in operation. In the pre-operation stage, the liquid-crystal display device where the liquid-crystal display panel is located may be in a state that is about to be turned on but not turned on. The liquid-crystal display panel may have to be preheated in the pre-operation stage to improve the turn-on speed and display performance of the liquid-crystal display device at a low-temperature environment. In the operation stage, the preheating may have been completed, and the liquid-crystal display device may have been turned on and may be in an operation state).

In the pre-operation stage, the heating electrode may be connected to the heating potential interface on the heating control module, and may be in an operation state. The display panel may be heated by the heat generated by the heating electrode. Compared with a heating manner where a heating sheet is disposed outside the liquid-crystal display panel, the liquid-crystal display panel in the disclosed embodiments may be heated by the built-in heating electrode inside the liquid-crystal display panel, such that the heat may directly act on the liquid-crystal layer, thereby improving the heating speed and further improving the turn-on speed in a low-temperature environment.

Further, in the operation stage of the liquid-crystal display panel, in a special operation environment, the liquid-crystal display panel may be continuously heated as needed to keep the liquid-crystal molecules in the liquid-crystal layer at a suitable operation temperature. Therefore, the viscous resistance of the liquid-crystal molecules may be reduced, the state change speed of the liquid-crystal molecules may be improved, the display image tailing phenomenon may be improved, and the display quality of the liquid-crystal display device may be improved.

In one embodiment, a temperature sensor and a heating controller (not illustrated) may be disposed in the liquid-crystal display panel. When the temperature sensor detects that the temperature of the liquid-crystal display panel is lower than a preset temperature value, the heating controller may control the heating control module to operate, and further may control the heating electrode to heat to make the liquid-crystal display panel operate normally.

Figure 5:
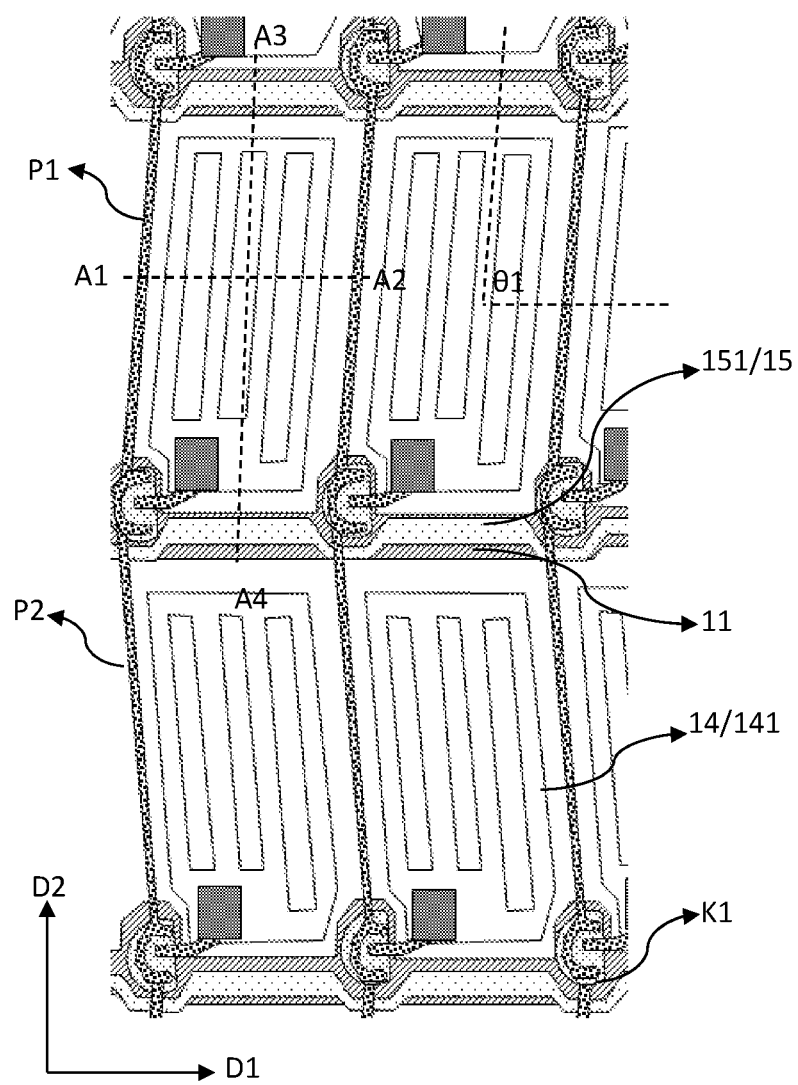
FIG. 5 illustrates a schematic local zoom-in view of a first base of an exemplary liquid-crystal display panel consistent with disclosed embodiments of the present disclosure.
Figure 6:
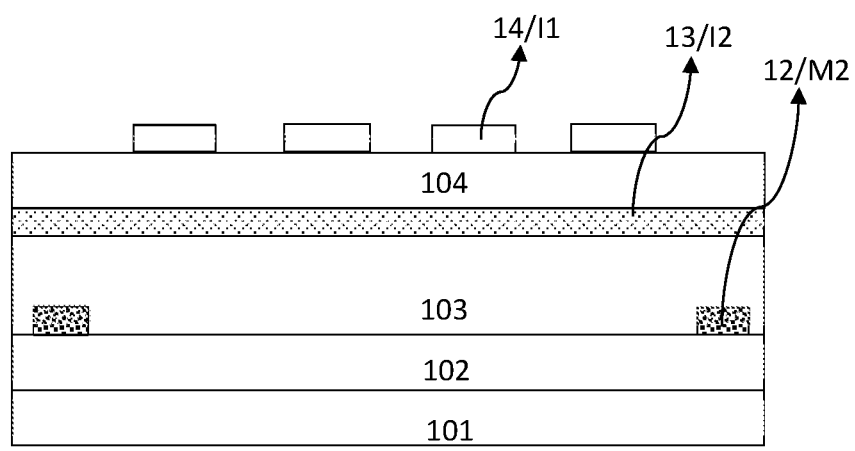
FIG. 6 illustrates a schematic A1-A2-sectional view of the first base in FIG. 5 consistent with disclosed embodiments of the present disclosure.
Figure 7:
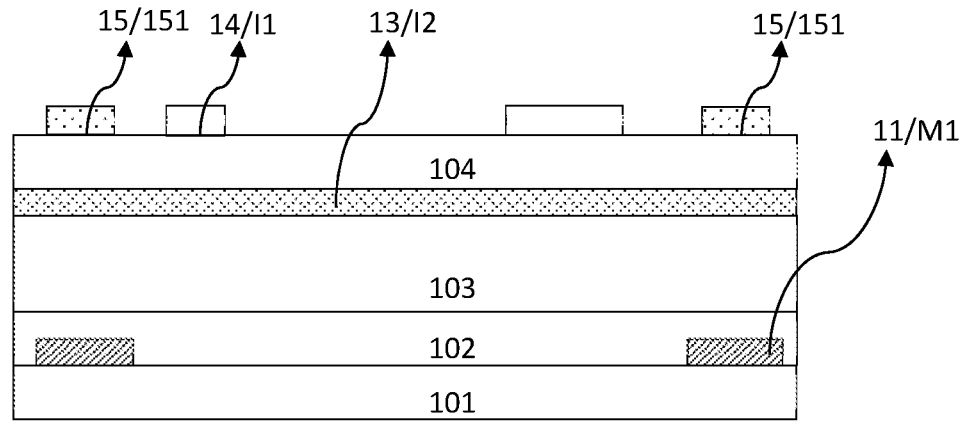
FIG. 7 illustrates a schematic A3-A4-sectional view of the first base in FIG. 5 consistent with disclosed embodiments of the present disclosure.

The detailed structures of the pixel array and the heating electrode 15 of the first base 10 are illustrated in FIGS. 5-7. FIG. 5 illustrates a schematic local zoom-in view of the first base consistent with disclosed embodiments of the present disclosure, FIG. 6 illustrates a schematic A1-A2-sectional view of the first base in FIG. 5, and FIG. 7 illustrates a schematic A3-A4-sectional view of the first base in FIG. 5. Referring to FIGS. 5-7, each heating electrode 15 may include one or more sub-electrodes 151, and each sub-electrode 151 may pass through the display region AA along the light-shielding region between two rows of sub-pixels P.

In one embodiment, the first base 10 may include the first substrate 101, and a first metal layer M1 disposed on a side of the first substrate 101 facing toward the liquid-crystal layer. The first metal layer M1 may include the plurality of gate lines 11 and the gate of each switching element K for display purpose. The plurality of gate lines 11 may be connected to a corresponding gate of the switching element K for display purpose, respectively.

The first base 10 may also include a second metal layer M2 disposed on the first metal layer M1. The second metal layer M2 may be insulated from the first metal layer M1 through a gate insulating layer 102. The second metal layer M2 may include the plurality of data lines 12 and the source and the drain of each switching element K for display purpose. The plurality of data lines 12 may be connected to the source of a corresponding switching element K for display purpose, respectively. In addition, the first base 10 may include a passivation layer 103 covering the second metal layer M2. The passivation layer 103 may serve as an insulating spacer, and may planarize the segment difference formed by the gate lines 11 and the data lines 12.

Moreover, the first base 10 may include a second electrode layer I2 disposed on the passivation layer 103. The second electrode layer I2 may include a common electrode 13. Further, the first base 10 may include a first electrode layer I1 disposed on the second electrode layer I2. The first electrode layer I1 may be insulated from the second electrode layer I2 by an insulating spacer layer 104. The first electrode layer I1 may include the pixel electrode 14. In each sub-pixel, the pixel electrode 14 may include a plurality of strip electrodes 141. The first electrode layer I1 and the second electrode layer I2 may be made of a transparent conductive material, e.g., indium tin oxide and any other suitable transparent metal oxide material, to improve the transmittance of the liquid-crystal display panel.

The first base 10 may further include an active layer disposed between the source and the drain of the switching element K for display purpose. The active layer may at least partially overlap with the gate of the switching element K for display purpose to form a channel region K1 of the switching element K for display purpose.

In one embodiment, each strip electrode 141 may be connected to the drain of a corresponding switching element K for display purpose through a through-hole sequentially penetrating through the insulating spacer layer 104, the second electrode layer I2, and the passivation layer 103. Under the control of the scanning signal provided by the gate line 11, the strip electrode 141 may receive the data signal during operation. The common electrode 13 may receive a common signal through a common signal line or a common signal source directly connected to the driving integrated circuit. The common electrode 13 may cooperate with the pixel electrode to generate a parallel electric field in the liquid-crystal display panel, which may drive the liquid-crystal molecules to change the molecular state, and to allow or block the pass of light.

Further, the first base 10 may include the heating electrode 15. The heating electrode 15 may include a plurality of sub-electrodes 151. Each sub-electrode may be disposed in the light-shielding region between two rows of the sub-pixels and may pass through the entire display region AA in the row direction. The effect of capacitive coupling between the heating electrode 15 and other conductive layers on the state change of the liquid-crystal molecules in the opening region may be reduced. In other words, even if there is the capacitive coupling between the heating electrode 15 and other conductive layers, the capacitive coupling between the heating electrode 15 and other conductive layers may occur within the region covered by the black matrix. The stray light generated by the state change of the liquid-crystal molecules in the region covered by the black matrix may be blocked by the black matrix, which may not or may negligibly affect the image display performance. Therefore, the influence of the introduction of the heating electrode on the display performance of the liquid-crystal display panel may be reduced.

In one embodiment, the heating electrode 15 may be made of a same material and formed at a same layer as the pixel electrode 14. In another embodiment, the heating electrode 15 and the pixel electrode 14 may be formed by a same mask and a same exposure process. Therefore, the introduction of the heating electrode 15 may not increase the film structure of the liquid-crystal display panel, and, thus, the thickness of the liquid-crystal display panel may be reduced. At the same time, the manufacturing process may not introduce new mask and may not increase fabrication procedures, such that the production cost may be reduced.

In one embodiment, the first base may adopt a dummy dual domain structure as illustrated in FIG. 5. In each sub-pixel P, the pixel electrode 14 may include the plurality of strip electrodes 141 that are connected to each other and arranged in parallel. In one embodiment, the plurality of strip electrodes 141 may be formed by engraving the pixel electrode 14. An angle between an extension direction of the strip electrode 141 and the row direction (a direction indicated by D1 in the drawing) is θ1, where 45°<θ1<90°. The plurality of sub-pixels P may include a first sub-pixel P1 and a second sub-pixel P2 that are adjacently disposed and arranged in the column direction (a direction indicated by D2 in the drawing). The strip electrode 141 in the first sub-pixel P1 and the strip electrode 141 in the second sub-pixel P2 may be symmetrically arranged with respect to the row direction, which may provide a wider viewing angle than the single domain technique, and may satisfy the user's increasingly need for high display quality.

In one embodiment, each sub-electrode 151 may be extended in the row direction and may be disposed between adjacent two rows of sub-pixels. In other words, each sub-electrode 151 may be disposed in the light-shielding region between adjacent two rows of opening regions, and may avoid the region where the channel region K1 of the switching element for display purpose is located. Therefore, the heat generated by the heating electrode may be prevented from directly acting on the channel region K1 and from impairing the performance of the switching element for display purpose. In one embodiment, a minimum distance between the sub-electrode 151 and the region where the channel region K1 of the switching element is located may be greater than or equal to 50 μm.

On the first base of the above-described dummy dual domain structure, because the strip electrode 141 in the first sub-pixel P1 and the strip electrode 141 in the second sub-pixel P2 are symmetrically arranged with respect to the row direction, the effects of the electric fields generated by the upper and lower pixel electrodes and received by the liquid-crystal molecules at the junction between the strip electrode 141 in the first sub-pixel P1 and the strip electrode 141 in the second sub-pixel P2 may cancel each other. Therefore, compared with the liquid-crystal molecules in the opening region, the rotation directions of the liquid-crystal molecules at the junction between the strip electrode 141 in the first sub-pixel P1 and the strip electrode 141 in the second sub-pixel P2 may be slightly disordered, and a black domain line phenomenon may occur. The black domain line phenomenon may often be improved by widening the light-shielding region or widening the black matrix. In one embodiment, the sub-electrode 151 may be disposed at such corresponding location, and may be disposed in a region covered by the black matrix. Therefore, the width of the sub-electrode 151 may increase to improve the heating performance, and the influence of the introduction of the heating electrode on the display performance may be further reduced.

In one embodiment, the gate line 11 may at least partially overlap with the sub-electrode 151. In another embodiment, the sub-electrode 151 may be disposed in a region covered by the gate line 11. Therefore, the introduction of the sub-electrode 151 may not increase the width of the light-shielding region, and the influence of the introduction of the heating electrode on the aperture ratio of the liquid-crystal display panel may be minimized or eliminated.

Figure 8:
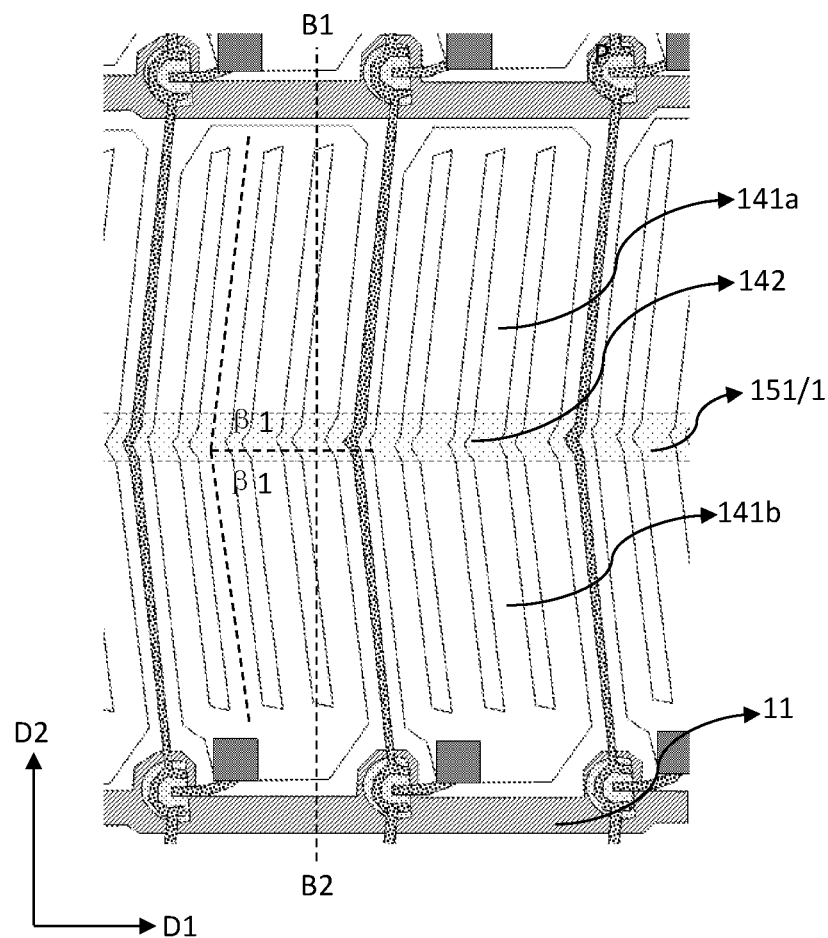
FIG. 8 illustrates a schematic local zoom-in view of a first base of another exemplary liquid-crystal display panel consistent with disclosed embodiments of the present disclosure.
Figure 9:
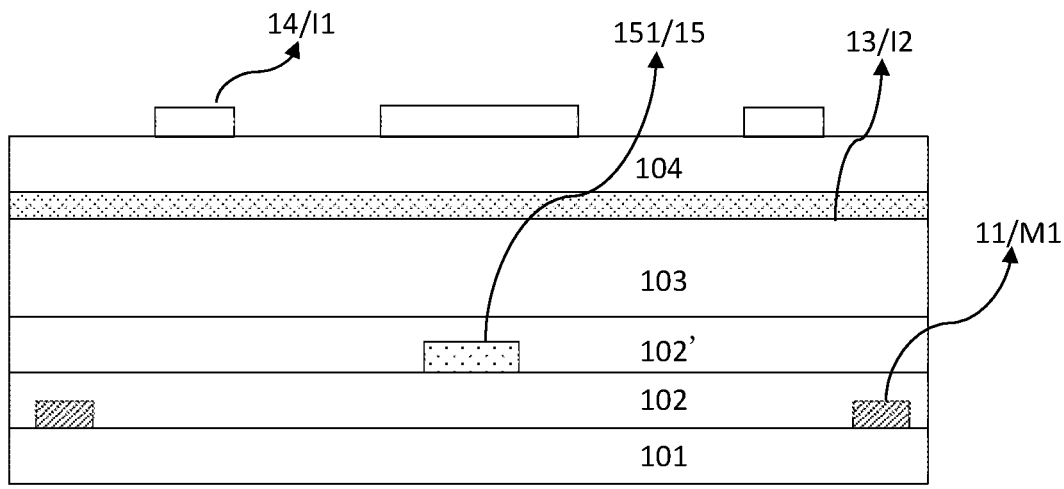
FIG. 9 illustrates a schematic B1-B2-sectional view of the first base in FIG. 8 consistent with disclosed embodiments of the present disclosure.

In another embodiment, the wiring manner of each sub-electrode of the heating electrode may be illustrated in FIGS. 8-9. FIG. 8 illustrates a schematic local zoom-in view of another first base consistent with disclosed embodiments of the present disclosure, and FIG. 9 illustrates a schematic B1-B2-sectional view of the first base in FIG. 8. Referring to FIGS. 8-9, the first base may include a plurality of opening regions and a light-shielding region disposed around the opening regions. Each opening region may be disposed in each sub-pixel P. The gate lines 11 and the data lines 12 may be disposed in the light-shielding region.

In one embodiment, the first base may include the first electrode layer I1 and the second electrode layer I2. The second electrode layer I2 may be disposed between the first electrode layer I1 and the first substrate 101. In other words, the second electrode layer I2 may be disposed on a side of the first electrode layer I1 away from the liquid-crystal layer. The first electrode layer I1 may include the pixel electrode 14, and the second electrode layer I2 may include the common electrode 13. At least a portion of the heating electrode 15 may pass through the opening region of the first base. The film layer where the heating electrode 15 is located may be disposed between the second electrode layer I2 and the first substrate 101. Under the shielding effect of the second electrode layer I2, even if there is a coupling electric field between the heating electrode 15 and other conductive layers, the parallel electric field of the liquid-crystal display panel may not be affected. In one embodiment, the film layer where the heating electrode 15 is located may be disposed between the second electrode layer I2 and the first metal layer M1. The heating electrode 15 may be insulated from the second electrode layer I2 through the passivation layer 103, and may be insulated from the first metal layer M1 through the gate insulating layer 102.

Further, a second metal layer (not illustrated) for forming the data lines 12 may be disposed between the film layer where the heating electrode 15 is located and the first metal layer M1. The second metal layer may be disposed between the gate insulating layer 102 and the film layer where the heating electrode 15 is located, and may be insulated from the film layer where the heating electrode 15 is located through an interlayer insulating layer 102'.

In one embodiment, in each sub-pixel P, the pixel electrode 14 may include the plurality of strip electrodes 141 that are connected to each other and arranged in parallel, and the plurality of strip electrodes 141 may be formed by engraving the pixel electrode 14. Each strip electrode 141 may include a first branch electrode 141a and a second branch electrode 141b that are connected to each other. An angle between an extension direction of a straight line where the first branch electrode 141a is located and the row direction (a direction indicated by D1 in the drawing) is β1, where 45°<β1<90°. The second branch electrode 141b and the first branch electrode 141a may be symmetrically disposed with respect to the row direction. A first corner 142 may be formed at a junction between the first branch electrode 141a and the second branch electrode 141b of a same one strip electrode 141. In a same row of sub-pixels P, the vertices of the first corners 142 in all the sub-pixels may be located in a region covered by a same one sub-electrode 151. In other words, each sub-electrode 151 may be disposed at the junction between the first branch electrode 141a and the second branch electrode 141b, may be extended along the junction in a same row of sub-pixels P, and may pass through the display region of the liquid-crystal display panel.

On the first base of the above-described dummy dual domain structure, because the first branch electrode 141a and the second branch electrode 141b are symmetrically arranged with respect to the row direction, the effects of the electric fields generated by the upper and lower pixel electrodes and received by the liquid-crystal molecules at the junction between the first branch electrode 141a and the second branch electrode 141b may cancel each other. Therefore, compared with the liquid-crystal molecules in the opening region, the liquid-crystal molecules at the junction between the first branch electrode 141a and the second branch electrode 141b may have slightly disordered rotation directions, or may no longer rotate with the direction of the electric field. Therefore, the black domain line phenomenon may occur at the junction between the first branch electrode 141a and the second branch electrode 141b, and, thus, a non-translucent region may be formed. In one embodiment, each sub-electrode may be disposed at such corresponding location, and, thus, the influence of the introduction of the heating electrode on the display performance may be further reduced while heating the liquid-crystal molecules. In other words, the introduction of the heating electrode may not reduce the area of the opening region, and, thus, may not affect the aperture ratio of the liquid-crystal display panel.

In one embodiment, the sub-electrode may be made of a metal or a metal oxide, which is not limited by the present disclosure. Because the sub-electrode is disposed in the non-translucent region, even if the sub-electrode is made of a light-shielding metal, the aperture ratio of the liquid-crystal display panel may not be affected.

Figure 10:
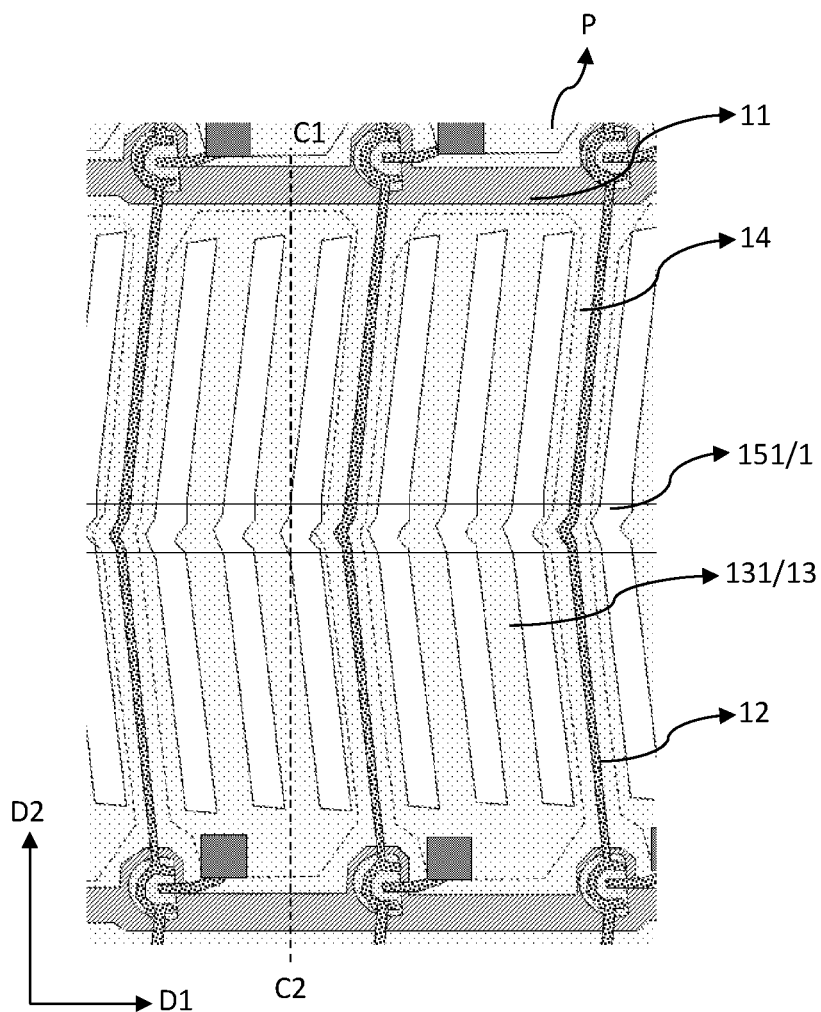
FIG. 10 illustrates a schematic local zoom-in view of a first base of another exemplary liquid-crystal display panel consistent with disclosed embodiments of the present disclosure.
Figure 11:
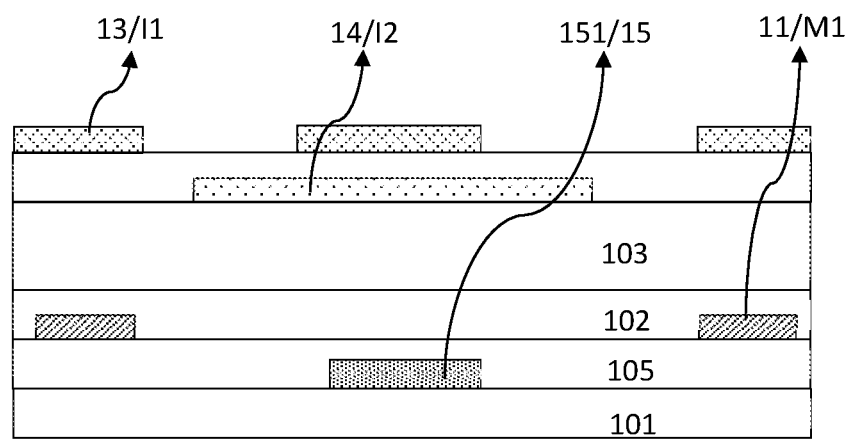
FIG. 11 illustrates a schematic C1-C2-sectional view of the first base in FIG. 10 consistent with disclosed embodiments of the present disclosure.

FIG. 10 illustrates a schematic local zoom-in view of another first base consistent with disclosed embodiments of the present disclosure, and FIG. 11 illustrates a schematic C1-C2-sectional view of the first base in FIG. 10. The first base illustrated in FIGS. 10-11 may be a dummy dual domain structure. The first base may include the first electrode layer I1 and the second electrode layer I2. The second electrode layer I2 may be disposed between the first electrode layer I1 and the first substrate 101. In other words, the second electrode layer I2 may be disposed on a side of the first electrode layer I1 away from the liquid-crystal layer. The first electrode layer I1 may include the common electrode 13, and the second electrode layer I2 may include the pixel electrode 14.

Each sub-electrode 151 may pass through the opening region of the first base, and the film layer where each sub-electrode 151 is located may be disposed between the second electrode layer I2 and the first substrate 101. Under the shielding effect of the second electrode layer I2, even if there is a coupling electric field between the heating electrode 15 and other conductive layers, the parallel electric field of the liquid-crystal display panel may not be affected. In one embodiment, the common electrode 13 may be a whole-panel type, and a plurality of common strip electrodes 131 may be formed in each sub-pixel P by engraving the common electrode 13. The second electrode layer I2 may include the plurality of pixel electrodes 14, which may be disposed in the plurality of corresponding sub-pixels P, respectively. Each pixel electrode may be connected to the drain of a corresponding switching element K for display purpose. The common electrode 13 may cooperate with the pixel electrode 14 to generate a parallel electric field in the liquid-crystal display panel, which may drive the liquid-crystal molecules to change the molecular state, and to allow or block the pass of light.

In one embodiment, the film layer where the heating electrode 15 is located may be disposed between the second electrode layer I2 and the first metal layer M1. The heating electrode 15 may be insulated from the second electrode layer I2 through the passivation layer 103, and may be insulated from the first metal layer M1 through the gate insulating layer 102. Further, a second metal layer (not illustrated) for forming the data lines 12 may be disposed between the film layer where the heating electrode 15 is located and the first metal layer M1. The second metal layer may be disposed between the gate insulating layer 102 and the film layer where the heating electrode 15 is located, and may be insulated from the film layer where the heating electrode 15 is located through the interlayer insulating layer 102'. The heating electrode may be made of a metal, or a metal oxide, which is not limited by the present disclosure.

Figure 12:
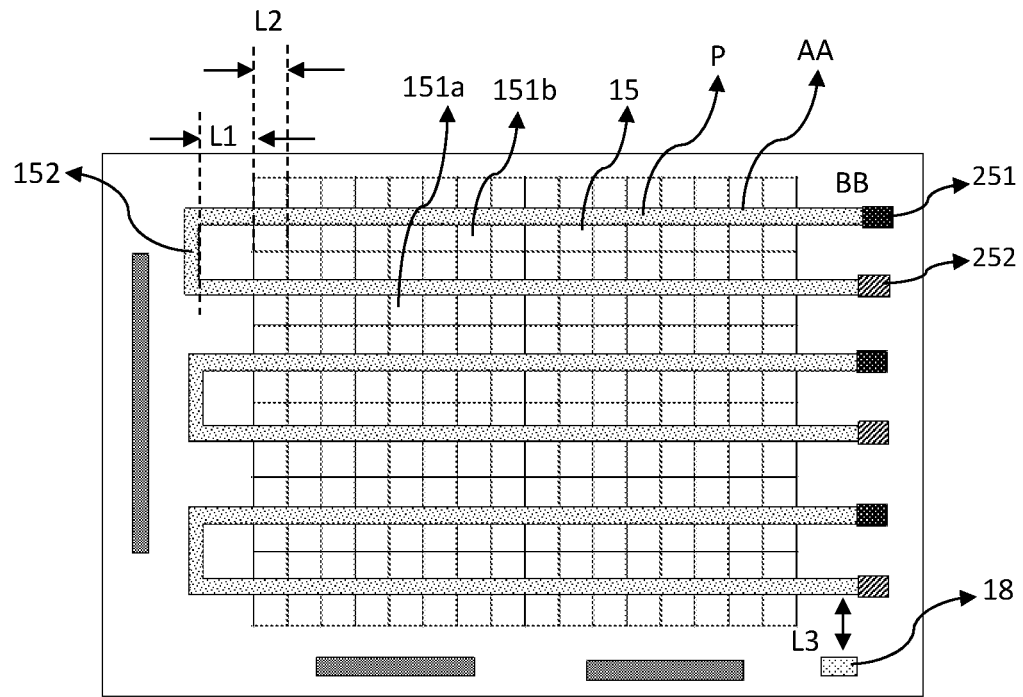
FIG. 12 illustrates a schematic diagram of a heating electrode of another exemplary liquid-crystal display panel consistent with disclosed embodiments of the present disclosure.

FIG. 12 illustrates a schematic diagram of a heating electrode of another liquid-crystal display panel consistent with disclosed embodiments of the present disclosure. The structure of the heating electrode in FIG. 12 is similar to the structure illustrated in FIG. 4. Referring to FIG. 12, the first base 10 may further include a plurality of heating electrodes 15 disposed on a side of the first substrate 101 facing toward the liquid-crystal layer 30. The two ends of each heating electrode 15 may be connected to the first heating power terminal 251 for outputting a high voltage and the second heating power terminal 252 for outputting a low voltage, respectively. Each heating electrode 15 may include one or more sub-electrodes that are connected to each other. In one embodiment, each heating electrode 15 may include electrically-connected first sub-electrode 151a and second sub-electrode 151b. The first sub-electrode 151a and the second sub-electrode 151b may be extended in the row direction and span a row of sub-pixels P, respectively. The first sub-electrode 151a may be connected to the second sub-electrode 151b through the connection electrode 152 extended in the column direction. In one embodiment, the first sub-electrode 151a, the second sub-electrode 151b and the connection electrode 152 may be made of a same material and may be formed in a same film forming process.

In one embodiment, a minimum distance between a side of the connection electrode 152 close to the display region AA and the display region AA is L1, and a width of each sub-pixel P in the display region AA in the row direction is L2, where L1≥2*L2. In this case, sufficient heating electrodes may be disposed in a frame region of the liquid-crystal display panel to increase a temperature of the peripheral region of the liquid-crystal display panel. Therefore, the temperature difference between the edge region and the central region of the display region may be minimized, and the temperature uniformity of the liquid-crystal display panel may increase.

In one embodiment, the first base 10 may further include an anti-static circuit 18. A distance between the heating electrode 15 closest to the anti-static circuit 18 and the anti-static circuit 18 is L3, where L3≥50 μm. Therefore, the heat generated by the heating electrode 15 may be prevented from damaging the anti-static circuit 18. In one embodiment, the detailed wiring manner of the heating electrode 15 may be illustrated in FIGS. 5-11.

Figure 13:
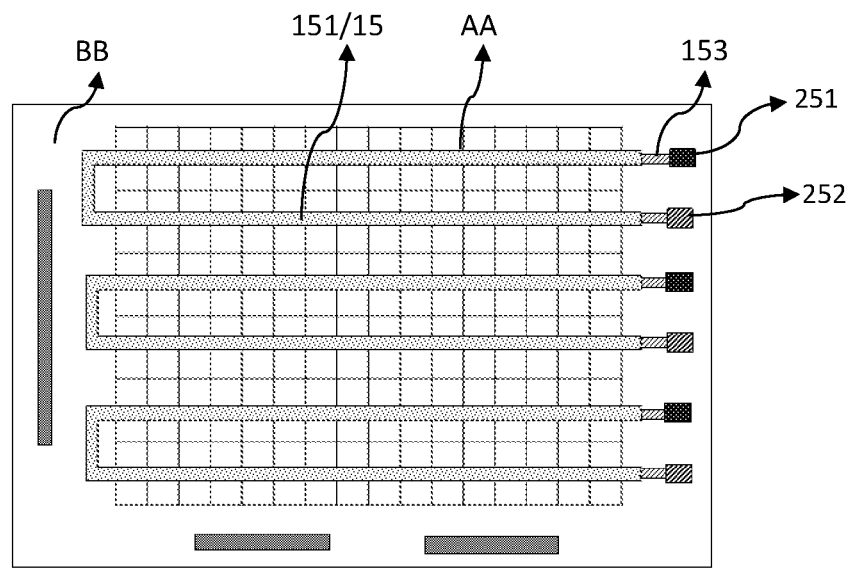
FIG. 13 illustrates a schematic diagram of a heating electrode of another exemplary liquid-crystal display panel consistent with disclosed embodiments of the present disclosure.

FIG. 13 illustrates a schematic diagram of a heating electrode of another liquid-crystal display panel consistent with disclosed embodiments of the present disclosure. The structure of the heating electrode in FIG. 13 is similar to the structure illustrated in FIG. 4 or FIG. 12. In one embodiment, the heating electrode may be made of a transparent metal oxide, e.g., indium tin oxide, to improve the transmittance of the liquid-crystal display panel. In another embodiment, the heating electrode may be formed in a same layer as the pixel electrode to reduce the manufacturing process. Each heating electrode 15 may further include a jumper metal 153 disposed at each terminal of the heating electrode 15. The jumper metal 153 may be made of a metal material, and may be disposed in the non-display region BB. In other words, the jumper metal 153 may be disposed in the frame region of the liquid-crystal display panel. In one embodiment, the jumper metal 153 may be formed as a same layer as the gate line or the data line. The plurality of sub-electrodes 151 of the heating electrode 15 may pass through the display region AA and may be extended to the non-display region BB. The two ends of each heating electrode 15 may be connected to the corresponding first heating power terminal 251 and second heating power terminal 252 through the jumper metals 153, respectively.

In the frame region or the peripheral wiring region of the liquid-crystal display panel, due to the limitations of the frame and the step size, in practical applications, the wires in the peripheral wiring region may be very dense. Therefore, compared with the heating electrode in the display region, a width of the jumper metal 153 may be designed to be substantially narrow. When the jumper metal 153 is also made of transparent metal oxide material as the heating electrode in the display region AA, the resistance thereof may be substantially large, and a substantially large amount of heat may be generated in the frame region or the step region, which may cause a non-uniform temperature of the display panel and may cause damages to other driving circuits in the frame region. In the disclosed embodiments, the above-described issues may be resolved by forming the jumper metal in the peripheral wiring region using a metal material to connect the heating electrode and the heating power terminal.

At the same time, when the heating electrode is made of the transparent metal oxide and is formed in the same layer as the pixel electrode or the common electrode, a portion of the heating electrode disposed in the peripheral wiring region may be generally disposed at the uppermost layer of the first base, and may not be protected by any other layer. Moreover, technically speaking, the portion of the heating electrode disposed in the peripheral wiring region may be disposed at the step and close to a cutting edge of the first base, and, thus, the glass debris produced by the cutting may be likely to cause scratch damages on the heating electrode film layer. When the jumper metal is made of a metal material, the jumper metal may be formed in the same layer as the gate line or the data line. Even in the peripheral wiring region, the jumper metal may be covered by the passivation layer or the flat layer to be prevented from scratch damages, thereby improving the product stability.

Figure 14:
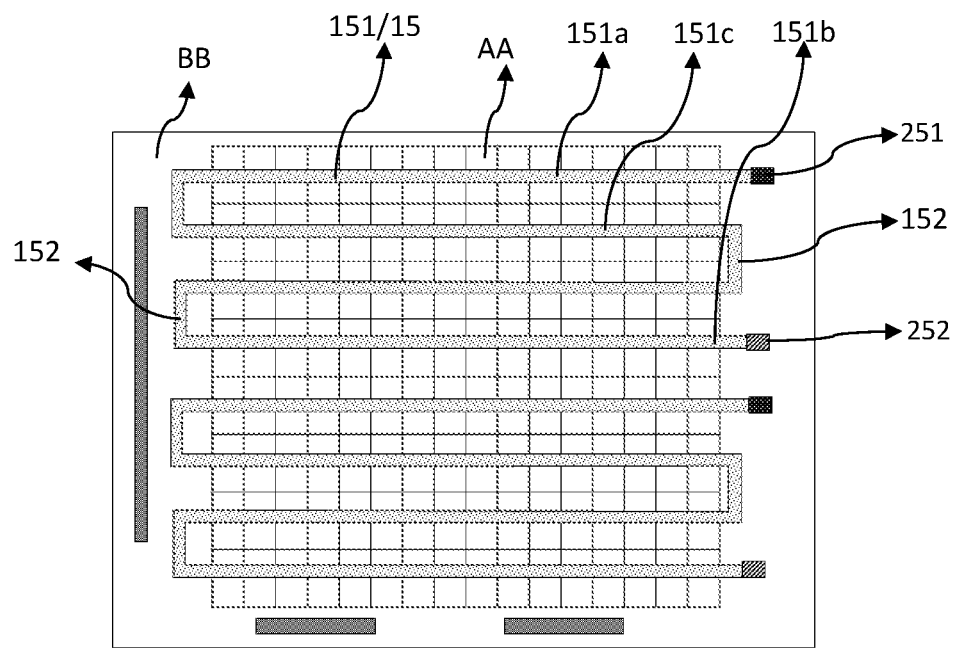
FIG. 14 illustrates a schematic diagram of a heating electrode of another exemplary liquid-crystal display panel consistent with disclosed embodiments of the present disclosure.

FIG. 14 illustrates a schematic diagram of a heating electrode of another liquid-crystal display panel consistent with disclosed embodiments of the present disclosure. The structure of the heating electrode in FIG. 14 is similar to the structure illustrated in FIG. 4, FIG. 12, or FIG. 13. Referring to FIG. 14, the first base may include a plurality of heating electrodes 15. The two ends of each heating electrode 15 may be connected to the first heating power terminal 251 for outputting a high voltage and the second heating power terminal 252 for outputting a low voltage, respectively. Each heating electrode 15 may include three or more sub-electrodes 151. Each sub-electrode may be extended in the row direction and may pass through the entire display region AA. In each heating electrode 15, adjacent sub-electrodes 151 may be electrically connected through the connection electrode 152 disposed in the non-display region BB.

In one embodiment, based on the heating electrode illustrated in FIG. 4, FIG. 12, or FIG. 13, each heating electrode may further include at least one third sub-electrode 151c. Each third sub-electrode 151c may be extended in the row direction and span a row of sub-pixels. In the column direction, the third sub-electrode 151c may be disposed between the first sub-electrode 151a and the second sub-electrode 151b, and the first sub-electrode 151a may be electrically connected to the second sub-electrode 151b through the third sub-electrode 151c.

A quantity of the sub-electrodes 151 in each heating electrode may be designed according to the area of the display region of the liquid-crystal display panel and the magnitude of the voltage outputted from the heating power terminal. Therefore, a quantity of the heating power terminals may be reduced to reduce costs while ensuring that each heating electrode is connected to a separate heating power terminal to ensure the operation stability thereof. In one embodiment, the detailed wiring manner of the heating electrode 15 may be illustrated in FIGS. 5-11.

Figure 15:
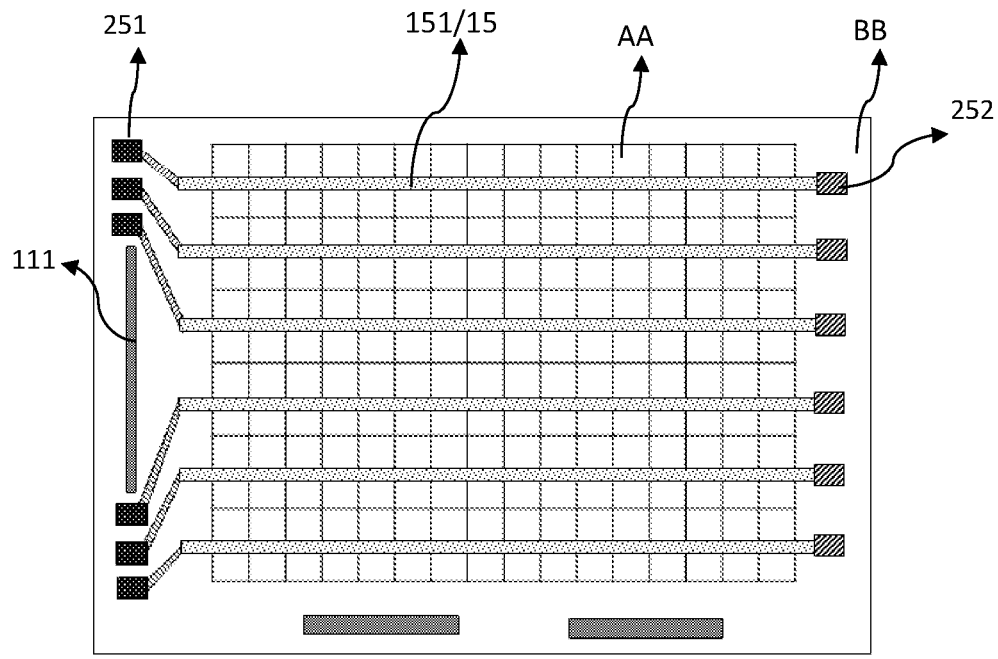
FIG. 15 illustrates a schematic diagram of a heating electrode of another exemplary liquid-crystal display panel consistent with disclosed embodiments of the present disclosure.

FIG. 15 illustrates a schematic diagram of a heating electrode of another liquid-crystal display panel consistent with disclosed embodiments of the present disclosure. The structure of the heating electrode in FIG. 15 is similar to the structure illustrated in FIG. 4, FIG. 12, or FIG. 13. Referring to FIG. 15, the liquid-crystal display panel may include a plurality of heating electrodes 15. The two ends of each heating electrode 15 may be connected to the first heating power terminal 251 for outputting a high voltage and the second heating power terminal 252 for outputting a low voltage, respectively. Each heating electrode 15 may include one sub-electrode 151. The sub-electrode 151 may be extended in the row direction and may pass through the entire display region AA. The two ends of each sub-electrode 151 may be connected to the first heating power terminal 251 for outputting a high voltage and the second heating power terminal 252 for outputting a low voltage, respectively. The first heating power terminal 251 and the second heating power terminal 252 may be disposed in the non-display region BB on opposite sides of the display region AA, respectively.

In one embodiment, all the first heating power terminals 251 and the gate driving circuit 111 may be disposed in the non-display region BB on a same side of the first base, and all the second heating power terminals 252 and the gate driving circuit 111 may be disposed in the non-display region BB on opposite sides of the first base, respectively. Therefore, each sub-electrode 151 may be separately controlled to further improve the operation stability of the heating electrodes and the temperature uniformity of the liquid-crystal display panel. In one embodiment, the detailed wiring manner of the heating electrode 15 may be illustrated in FIGS. 5-11.

Figure 16:
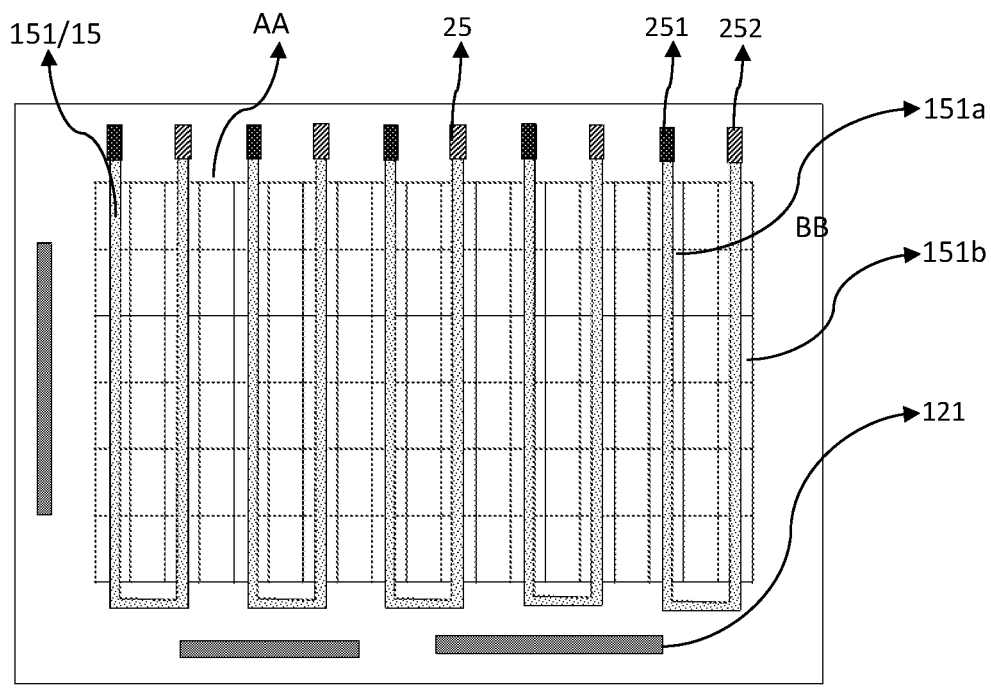
FIG. 16 illustrates a schematic diagram of a heating electrode of another exemplary liquid-crystal display panel consistent with disclosed embodiments of the present disclosure.

FIG. 16 illustrates a schematic diagram of a heating electrode of another liquid-crystal display panel consistent with disclosed embodiments of the present disclosure. The structure of the heating electrode in FIG. 16 is similar to the structure illustrated in FIG. 4, FIG. 12, or FIG. 13. Referring to FIG. 16, the first base may include a plurality of heating electrodes 15. The two ends of each heating electrode 15 may be connected to the first heating power terminal 251 for outputting a high voltage and the second heating power terminal 252 for outputting a low voltage, respectively. The heating electrodes 15 may be extended in the column direction and arranged in the row direction. The heating power terminal 25 thereof and the data driving circuit 121 may be disposed in the non-display region BB on the upper and lower sides of the display region AA, respectively. Each heating electrode 15 may include at least one sub-electrode 151 extended in the column direction.

In one embodiment, each heating electrode 15 may include at least electrically connected first sub-electrode 151*a* and second sub-electrode 151*b*. The first sub-electrode 151*a* and the second sub-electrode 151*b* may be extended in a column direction and may span a column of sub-pixels, respectively. One end of the first sub-electrode 151*a* may be electrically connected to the second sub-electrode 151*b*, and the other end of the first sub-electrode 151*a* may be electrically connected to the first heating power terminal 251. One end of the second sub-electrode 151*b* may be electrically connected to the first sub-electrode 151*a*, and the other end of the second sub-electrode 151*b* may be electrically connected to the second heating power terminal 252.

Figure 17:
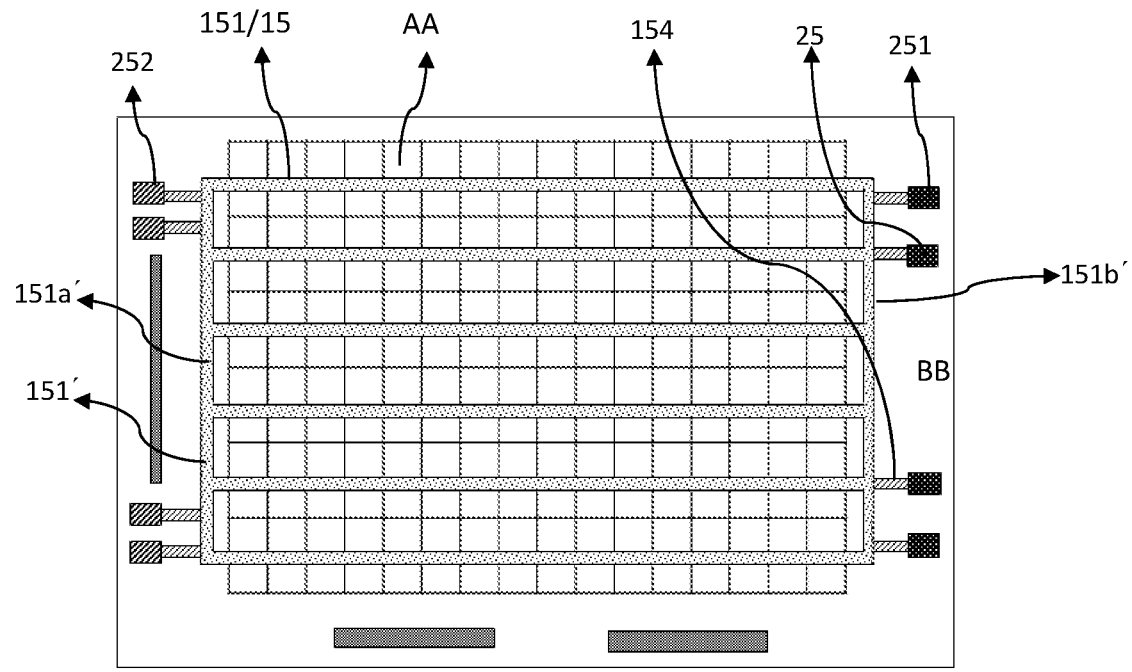
FIG. 17 illustrates a schematic diagram of a heating electrode of another exemplary liquid-crystal display panel consistent with disclosed embodiments of the present disclosure.

FIG. 17 illustrates a schematic diagram of a heating electrode of another liquid-crystal display panel consistent with disclosed embodiments of the present disclosure. Referring to FIG. 17, the first base 10 may include one heating electrode 15. The one heating electrode 15 may include a plurality of sub-electrodes 151 that are extended in the row direction and arranged in the column direction, and two bus electrodes 151', e.g., a first bus electrode 151*a*' and a second bus electrode 151*b*', disposed in the non-display region BB and extended in the column direction. Each sub-electrode may be extended in the row direction and may pass through the entire display region AA. The first bus electrode 151*a*' and the second bus electrode 151*b*' may be disposed in the non-display region BB on the left and right sides of the display region AA, respectively. The two ends of each sub-electrode may be connected to the first bus electrode 151*a*' and the second bus electrode 151*b*', respectively.

Each heating electrode 15 may further include a plurality of first heating power terminals 251 and a plurality of second heating power terminals 252. The plurality of first heating power terminals 251 and the plurality of second heating power terminals 252 may be disposed in the non-display region BB on both sides of the display region AA. One of the two bus electrodes 151', e.g., the first bus electrode 151*a*', may be connected to the plurality of first heating power terminals 251 through a plurality of power connection wires 154, and the other one of the two bus electrodes 151', e.g., the second bus electrode 151*b*' may be connected to the plurality of second heating power terminals 252 through a plurality of power connection wires 154, which may reduce the risk of burning out the power bus and increase stability of the display panel. In one embodiment, the detailed wiring manner of the heating electrode 15 may be illustrated in FIGS. 5-11.

Figure 18:
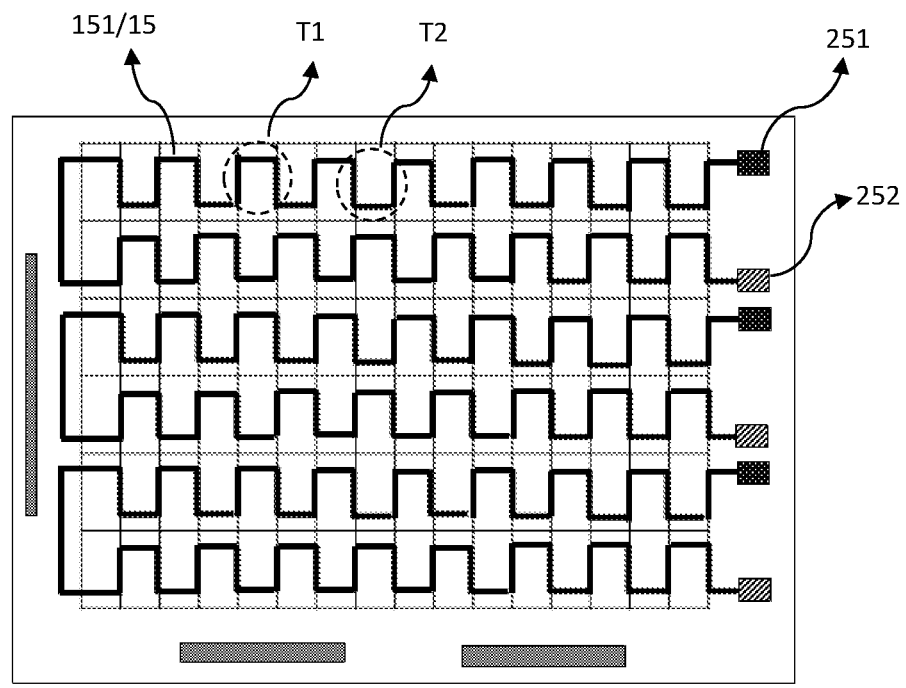
FIG. 18 illustrates a schematic diagram of a heating electrode of another exemplary liquid-crystal display panel consistent with disclosed embodiments of the present disclosure.
Figure 19:
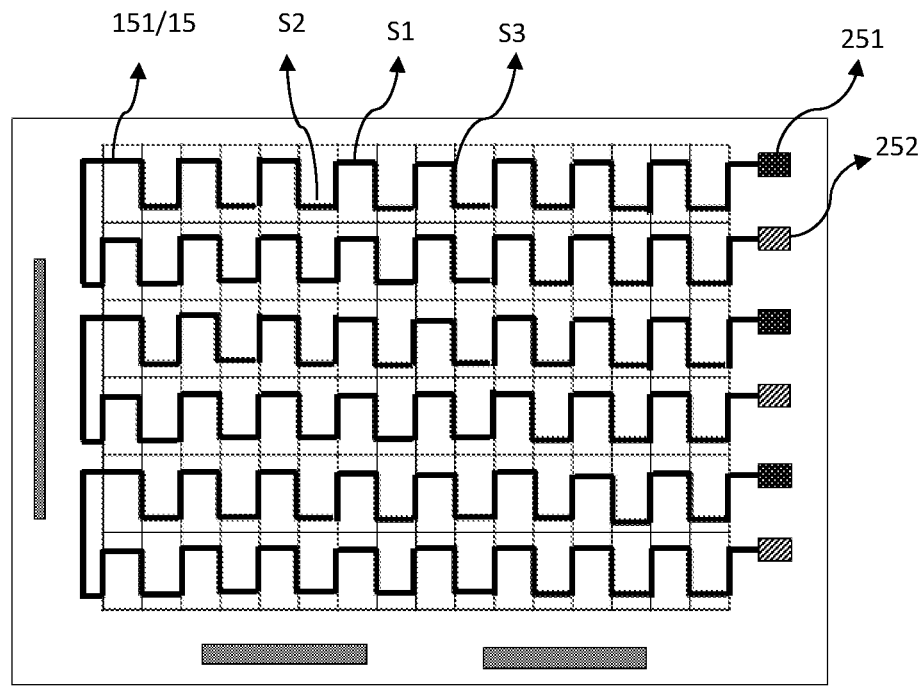
FIG. 19 illustrates a schematic diagram of a heating electrode of another exemplary liquid-crystal display panel consistent with disclosed embodiments of the present disclosure.

FIG. 18 illustrates a schematic diagram of a heating electrode of another liquid-crystal display panel consistent with disclosed embodiments of the present disclosure, and FIG. 19 illustrates a schematic diagram of a heating electrode of another liquid-crystal display panel consistent with disclosed embodiments of the present disclosure. The structures of the heating electrodes in FIGS. 18-19 are similar to the structure illustrated in FIG. 4, FIG. 12, or FIG. 13.

Referring to FIGS. 18-19, the first base may include a plurality of heating electrodes 15. The two ends of each heating electrode 15 may be connected to the first heating power terminal 251 for outputting a high voltage and the second heating power terminal 252 for outputting a low voltage, respectively. Each sub-electrode 151 may be extended in the row direction and may pass through the entire display region. Each sub-electrode 151 may have a bow shape in the extension direction thereof, and may include a plurality of protrusion portions T1 and recess portions T2. The protrusion portions T1 and the recess portions T2 may be alternately arranged, such that the arrangement of the heating electrodes in the display region may be substantially uniform, and the heating uniformity of the liquid-crystal display panel may be further improved.

In one embodiment, referring to FIG. 18, the protrusion portions T1 of adjacent two sub-electrodes 151 in the column direction may be disposed facing each other in the column direction, and the recess portions T2 of the adjacent two sub-electrodes 151 in the column direction may be disposed facing each other in the column direction. For example, the liquid-crystal display panel may include the $n^{th}$ sub-electrode and the $n+1^{th}$ sub-electrode that are disposed adjacent to each other, the protrusion portion T1 of the $n^{th}$ sub-electrode and the protrusion portion T1 of the $n+1^{th}$ sub-electrode may be disposed facing each other in the column direction, and the recess portion T2 of the $n^{th}$ sub-electrode and the recess portion T2 of the $n+1^{th}$ sub-electrode may be disposed facing each other in the column direction, where n may be an integer greater than or equal to 1.

In another embodiment, referring to FIG. 19, the protrusion portions T1 of adjacent two sub-electrodes 151 in the column direction may be disposed staggered in the column direction, and the recess portions T2 of the adjacent two sub-electrodes 151 in the column direction may be disposed staggered in the column direction. For example, the liquid-crystal display panel may include the $n^{th}$ sub-electrode and the $n+1^{th}$ sub-electrode that are disposed adjacent to each other, the protrusion portion T1 of the $n^{th}$ sub-electrode and the recess portion T2 of the $n+1^{th}$ sub-electrode may be disposed facing each other in the column direction, and the recess portion T2 of the $n^{th}$ sub-electrode and the protrusion portion T1 of the $n+1^{th}$ sub-electrode may be disposed facing each other in the column direction, where n may be an integer greater than or equal to 1. Therefore, the distribution uniformity of the heating electrode may be further improved.

The wiring manner of each sub-electrode 151 in the pixel array may include the following. Each sub-electrode 151 may include an upper edge S1 of the protrusion portion T1, a lower edge S2 of the recess portion T2, and a connection line S3 between the upper edge S1 and the lower edge S2. The upper edge S1 and the lower edge S2 may be disposed in the light-shielding region between adjacent pixel rows, respectively, and the connection line S3 may be disposed in the light-shielding region between adjacent pixel columns.

Figure 20:
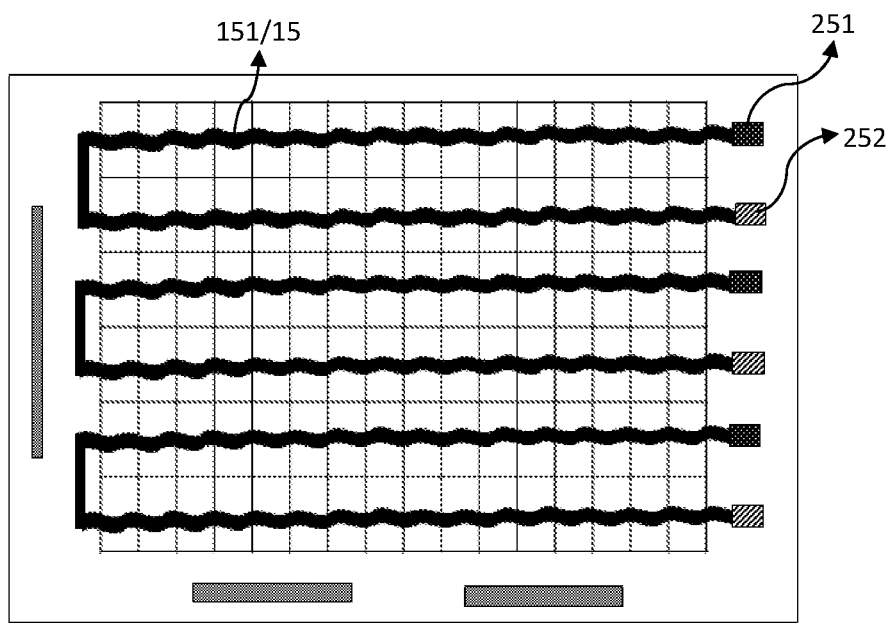
FIG. 20 illustrates a schematic diagram of a heating electrode of another exemplary liquid-crystal display panel consistent with disclosed embodiments of the present disclosure.

FIG. 20 illustrates a schematic diagram of a heating electrode of another liquid-crystal display panel consistent with disclosed embodiments of the present disclosure. Referring to FIG. 20, each sub-electrode 151 may have a wave shape in an extension direction thereof.

The liquid-crystal display panel in the disclosed embodiments may include the oppositely disposed first base and second base, and the liquid-crystal layer sandwiched between the first base and the second base. At least one heating electrode may be disposed between the first substrate of the first base and the second substrate of the second base, and each heating electrode may include at least one sub-electrode. In other words, the heating electrode may be disposed inside the liquid-crystal display panel, and heat generated by the heating electrode may directly act on the liquid-crystal molecules in the liquid-crystal layer. Therefore, the liquid-crystal display panel may be quickly started in a low-temperature environment, and the response speed of the liquid-crystal display panel may be ensured. At the same time, the two ends of each heating electrode may be connected to the first heating power terminal for outputting a high voltage and the second heating power terminal for outputting a low voltage, respectively. In view of this, each heating electrode may be separately controlled. Compared with a case where the entire heating electrode layer is connected to one bus, which may have a risk of being burned out due to excessive current, the heating uniformity and the reliability of the liquid-crystal display panel may be improved.

Figure 21:
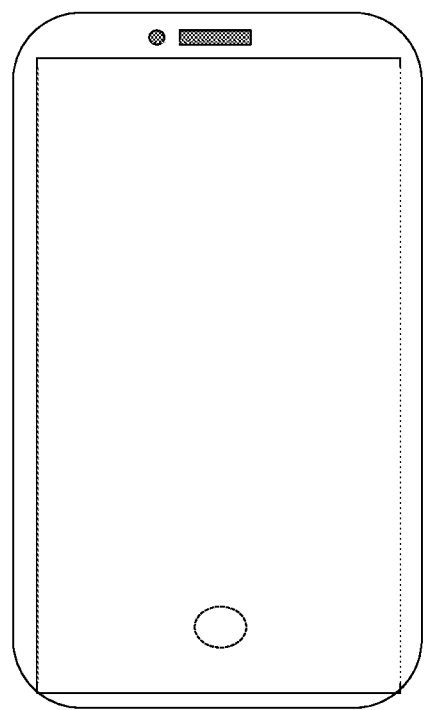
FIG. 21 illustrates a schematic top view of an exemplary liquid-crystal display device consistent with disclosed embodiments of the present disclosure.

The present disclosure also provides a liquid-crystal display device capable of being normally started and operated in a low temperature environment. FIG. 21 illustrates a schematic top view of the liquid-crystal display device consistent with disclosed embodiments of the present disclosure. Referring to FIG. 21, the liquid-crystal display device may include the above-disclosed liquid-crystal display panel and a case. The case may form an accommodation space for accommodating the display panel. The case may be rigid or flexible, which is not limited by the present disclosure. The display device in the disclosed embodiments may be a computer, a television, an in-vehicle display device, or any other suitable display device having a display function, which is not limited by the present disclosure.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments illustrated herein but is to be accorded the widest scope consistent with the principles and novel features disclosed herein.

What is claimed is:

1. A liquid-crystal display panel, comprising:
   a display region and a non-display region surrounding the display region;
   a first base, including a first substrate, and a plurality of gate lines, a plurality of data lines, and a plurality of sub-pixels, disposed on the first substrate, wherein the first base includes a plurality of opening regions and a light-shielding region, and each of the plurality of sub-pixels is disposed in a corresponding opening region;
   a second base, including a second substrate;
   a liquid-crystal layer, disposed between the first base and the second base;
   a heating power terminal, disposed in the non-display region, wherein the heating power terminal includes a first heating power terminal for outputting a high voltage and a second heating power terminal for outputting a low voltage; and
   at least one heating electrode, disposed between the first substrate and the second substrate and used to heat the liquid-crystal layer, wherein each heating electrode includes at least one sub-electrode disposed in the light-shielding region between adjacent two rows of opening regions, and two ends of the each heating electrode are connected to the first heating power terminal and the second heating power terminal through a jumper metal, respectively, wherein the jumper metal is disposed in the non-display region and has a width narrower than a width of the at least one sub-electrode in a direction perpendicular to the alignment of the jumper metal and the at least one sub-electrode.

2. The liquid-crystal display panel according to claim 1, wherein:
   the at least one heating electrode is formed on the first base; and
   the first heating power terminal and the second heating power terminal are formed on the first base.

3. The liquid-crystal display panel according to claim 2, wherein:
   the first base further includes a display driving circuit disposed in the non-display region on at least one side of the first base; and
   the heating power terminal and the display driving circuit are disposed in the non-display region on opposite sides of the display region, respectively.

4. The liquid-crystal display panel according to claim 2, wherein:
   the first base further includes a gate driving circuit disposed in the non-display region on one side of the first base in a row direction, wherein the plurality of gate lines are connected to the gate driving circuit; and
   the heating power terminal and the gate driving circuit are disposed in the non-display region on left and right sides of the display region, respectively.

5. The liquid-crystal display panel according to claim 4, wherein:
   the each heating electrode includes at least two electrically connected sub-electrodes,
   the at least two electrically connected sub-electrodes include a first sub-electrode and a second sub-electrode,
   the first sub-electrode and the second sub-electrode are extended in the row direction and span a row of sub-pixels, respectively,
   one end of the first sub-electrode is electrically connected to the second sub-electrode, and the other end of the first sub-electrode is electrically connected to the first heating power terminal, and
   one end of the second sub-electrode is electrically connected to the first sub-electrode, and the other end of the second sub-electrode is electrically connected to the second heating power terminal.

6. The liquid-crystal display panel according to claim 5, wherein:
   the first sub-electrode spans a $x^{th}$ row of sub-pixels, and the second sub-electrode spans a $x+1^{th}$ row of sub-pixels, wherein x is an integer greater than or equal to 1.

7. The liquid-crystal display panel according to claim 5, wherein:
   the each heating electrode further includes at least one third sub-electrode, and each third sub-electrode is extended in the row direction and spans a row of sub-pixels, wherein:
   in a column direction, the third sub-electrode is disposed between the first sub-electrode and the second sub-electrode, and
   the first sub-electrode is electrically connected to the second sub-electrode through the third sub-electrode.

8. The liquid-crystal display panel according to claim 5, wherein:
the each heating electrode further includes a connection electrode disposed in the non-display region and extended in a column direction, wherein adjacent sub-electrodes in the each heating electrode are electrically connected through the connection electrode; and
a minimum distance between a side of the connection electrode close to the display region and the display region is L1, and a width of each sub-pixel in the row direction is L2, wherein L1≥2*L2.

9. The liquid-crystal display panel according to claim 2, wherein:
the first base further includes a gate driving circuit disposed in the non-display region on one side of the first base in a row direction, wherein the plurality of gate lines are connected to the gate driving circuit;
the second heating power terminal and the gate driving circuit are disposed in the non-display region on a same side of the display region, and the first heating power terminal and the second heating power terminal are disposed in the non-display region on left and right sides of the display region, respectively; and
the each heating electrode includes one sub-electrode spanning a row of sub-pixels, wherein two ends of the one sub-electrode are electrically connected to the first heating power terminal and the second heating power terminal, respectively.

10. The liquid-crystal display panel according to claim 2, wherein:
the first base further includes a data driving circuit disposed in the non-display region on one side of the first base in a column direction, wherein the plurality of data lines are connected to the data driving circuit; and
the heating power terminal and the data driving circuit are disposed in the non-display region on upper and lower sides of the display region, respectively.

11. The liquid-crystal display panel according to claim 10, wherein:
the each heating electrode includes a first sub-electrode and a second sub-electrode that are electrically connected,
the first sub-electrode and the second sub-electrode are extended in a column direction and span a column of sub-pixels, respectively,
one end of the first sub-electrode is electrically connected to the second sub-electrode, and the other end of the first sub-electrode is electrically connected to the first heating power terminal, and
one end of the second sub-electrode is electrically connected to the first sub-electrode, and the other end of the second sub-electrode is electrically connected to the second heating power terminal.

12. The liquid-crystal display panel according to claim 2, wherein:
the first base further includes a gate driving circuit disposed in the non-display region on one side of the first base in a row direction, wherein the plurality of gate lines are connected to the gate driving circuit;
the first base includes one heating electrode; and
the heating power terminal includes a plurality of first heating power terminals and a plurality of second heating power terminals, the plurality of first heating power terminals and the plurality of second heating power terminals are disposed in the non-display region on left and right sides of the first base in the row direction, respectively.

13. The liquid-crystal display panel according to claim 12, wherein:
the one heating electrode includes a first bus electrode and a second bus electrode disposed in the non-display region on the left and right sides of the first base and extended in a column direction;
the one heating electrode further includes a plurality of sub-electrodes extended in the row direction and arranged in the column direction, wherein two ends of each sub-electrode of the plurality of sub-electrodes are connected to the first bus electrode and the second bus electrode, respectively; and
the plurality of first heating power terminals are electrically connected to the first bus electrode, and the plurality of second heating power terminals are electrically connected to the second bus electrode.

14. The liquid-crystal display panel according to claim 1, wherein:
the at least one sub-electrode is made of a transparent conductive material.

15. The liquid-crystal display panel according to claim 1, wherein:
each sub-electrode is wired in a bow shape in an extension direction of the each sub-electrode, and includes a plurality of protrusion portions and a plurality of recess portions, wherein the plurality of protrusion portions and the plurality of recess portions are alternately arranged.

16. The liquid-crystal display panel according to claim 15, wherein:
the liquid-crystal display panel includes an $n^{th}$ sub-electrode and an $n+1^{th}$ sub-electrode that are disposed adjacent to each other, a protrusion portion of the $n^{th}$ sub-electrode and a recess portion of the $n+1^{th}$ sub-electrode are disposed facing each other in a column direction, wherein n is an integer greater than or equal to 1.

17. The liquid-crystal display panel according to claim 15, wherein:
the each sub-electrode includes an upper edge of a protrusion portion of the plurality of protrusion portions, a lower edge of a recess portion of the plurality of recess portions, and a connection line between the upper edge and the lower edge, wherein the upper edge and the lower edge are disposed in the light-shielding region between adjacent pixel rows, respectively, and the connection line is disposed in the light-shielding region between adjacent pixel columns.

18. The liquid-crystal display panel according to claim 1, wherein:
each sub-electrode is wired in a wave shape in an extension direction of the each sub-electrode.

19. A liquid crystal display device, comprising:
a liquid-crystal display panel, wherein the liquid-crystal display panel includes:
a display region and a non-display region surrounding the display region;
a first base, including a first substrate, and a plurality of gate lines, a plurality of data lines, and a plurality of sub-pixels disposed on the first substrate, wherein the first base includes a plurality of opening regions and a light-shielding region, and each of the plurality of sub-pixels is disposed in a corresponding opening region;
a second base, including a second substrate;
a liquid-crystal layer, disposed between the first base and the second base;

a heating power terminal, disposed in the non-display region, wherein the heating power terminal includes a first heating power terminal for outputting a high voltage and a second heating power terminal for outputting a low voltage; and
at least one heating electrode, disposed between the first substrate and the second substrate and used to heat the liquid-crystal layer, wherein each heating electrode includes at least one sub-electrode disposed in the light-shielding region between adjacent two rows of opening regions, and two ends of the each heating electrode are connected to the first heating power terminal and the second heating power terminal through a jumper metal, respectively, wherein the jumper metal is disposed in the non-display region and has a width narrower than a width of the at least one sub-electrode in a direction perpendicular to the alignment of the jumper metal and the at least one sub-electrode.

* * * * *